United States Patent [19]

Stenersen

[11] Patent Number: 5,042,958

[45] Date of Patent: Aug. 27, 1991

[54] METHOD AND APPARATUS FOR INSTALLING SEWER AND DRAINAGE PIPE

[76] Inventor: Raymond W. Stenersen, P.O. Box 26, Rindge, N.H. 03461

[21] Appl. No.: 522,733

[22] Filed: May 14, 1990

[51] Int. Cl.$^5$ .............................................. F16L 1/00
[52] U.S. Cl. ..................................... 405/154; 248/49
[58] Field of Search ............... 405/154, 156, 157, 119; 248/49

[56] References Cited

U.S. PATENT DOCUMENTS

| | | | |
|---|---|---|---|
| 675,104 | 5/1901 | Oberle | 248/49 |
| 1,646,423 | 10/1927 | Schaub | 248/49 |
| 2,472,654 | 6/1949 | Engelke | 248/49 |
| 2,632,217 | 3/1953 | Flora | 248/49 X |
| 3,115,726 | 12/1963 | Sayles | 405/154 X |
| 3,771,751 | 11/1973 | Derivaz | 248/49 X |
| 4,033,534 | 7/1977 | Bergkvist | 248/49 |
| 4,090,686 | 5/1978 | Yarbrough | 405/154 X |
| 4,126,012 | 11/1978 | Waller | 405/157 |
| 4,195,809 | 4/1980 | Morrison | 405/119 X |
| 4,445,656 | 5/1984 | Leitch et al. | 248/49 |

Primary Examiner—Dennis L. Taylor
Attorney, Agent, or Firm—William B. Ritchie

[57] ABSTRACT

An apparatus and method for installing drainage and sewer pipe. A plurality of the apparatuses are driven into the ground along the location where the pipe is intended to be placed. Leveling or providing a pitch to the pipe for improved fluid flow is determined by the distance each apparatus is driven into the ground. The sections of pipe are then fastened to the apparatuses by convenient band-ties. The apparatus is intended to be buried with the installed pipe thereby eliminating extra labor costs in removing positioning devices and enabling the back-filling process to proceed in a single substantially continuous operation.

12 Claims, 2 Drawing Sheets

METHOD AND APPARATUS FOR INSTALLING SEWER AND DRAINAGE PIPE

BACKGROUND OF THE INVENTION

1. Field of the Invention

The invention relates to an apparatus and method for installing sectional sewer and drainage pipe.

2. Description of the Related Art

The installation of sewer and drainage pipe requires that the sections of pipe installed be first connected together and properly aligned within the trench so that the pipe is level. In some locations, local codes and conditions require that the pipe be set at a slight slope (colloquially called "pitch") so that liquid being transported will flow properly. After the pipe is in position according to the planned course, the area must be appropriately back-filled with crushed stone, sand, or other material depending on the particular application and depending on local conditions and local building codes. The first problem to overcome is the task of accurately placing the pipe in the location necessary to achieve the required function. Deviations in lateral position or, in particular, grade level can destroy the effectiveness of the system. The second difficulty in the procedure is to keep the pipe from moving while the back-fill material is being placed around the positioned pipe. The back-fill material which is often crushed rock will cause the pipe to move from its intended location unless the pipe is held firmly in place. These problems must be solved in consideration of cost constraints which dictate efficient placement, back-filling with a minimum amount of labor and extra equipment.

Various devices and methods have been designed to solve these problems. The back-fill material can be leveled in the trench to provide support for the pipe before placing the pipe in the trench. This approach is extremely labor intensive.

Drainage pipe has also been installed by the use of grade stakes to provide the position and grade of the pipe. A grade board is then fastened to the stakes and back-fill material is filled to the grade board level. Then, the pipe is fastened together on the grade board, and the remaining back-fill is deposited. Again, this method is labor intensive and adds significant cost to the installed system.

U.S. Pat. No. 3,568,455, discloses a method of installing pipe using removable supports. The supports permit the pipe to be first positioned within a trench or on a drainage field in the required location. Using thumbscrew mechanisms, the supports are adjusted to the desired height of back-fill material that will be placed below the pipe and for the depth that the supports will be embedded in the ground. Then, the trench is back-filled to the level at which the pipe is supported and the pipe supports are removed. This method requires a two-step back-filling method and extra time to remove the supports. Further, the removal of the apparatus is likely to result in some changes in the position of pipe.

Another approach is disclosed in U.S. Pat. No. 4,268,189. In this design, clamps are placed along the pipe which fasten the pipe to a longitudinal support arm. This arm is in turn anchored within the trench by an anchoring mechanism. The device and procedure requires substantial additional effort to fasten and remove the device. In addition to the added labor cost, the apparatus, itself, adds to the overall cost of installation due to the numerous metal parts to fabricate and assemble.

U.S. Pat. Nos. 4,268,190; 3,512,246; 317,158 disclose inventions relating to the pipe laying art and are of general interest.

A cost effective solution for laying drainage pipe that solves the two problems (positioning the pipe within the trench and maintaining the position of the pipe during the back-filling process) is not found in the prior art.

SUMMARY OF THE INVENTION

It is an object of the invention to provide support to drainage and sewer pipe while back-fill material is being placed around the pipe.

It is another object of the invention to provide a support method and apparatus that eliminates the need for other pipe supporting devices and methods such as grade stakes and grade boards.

It is still another object of the invention to provide a method and apparatus for supporting and positioning pipe within a trench or drainage field that can be accomplished quickly and with a minimum amount of labor.

It is still another object of the invention to provide a supporting apparatus that can be left permanently attached to the installed pipe due to its low cost.

It is still another object of the invention to provide a method and apparatus for laying pipe that is easily adjustable for a variety of sizes and styles of pipe.

Finally, it is an object of the invention to provide a method and apparatus which solves the problem of positioning the pipe as specified and of maintaining the pipe in that position while the back-fill material can be placed in a single, substantially continuous operation.

The invention comprises an apparatus and method that enables drainage and sewer pipe to be installed in a single, substantially continuous operation.

A stake means for positioning the apparatus at the required location is provided. The stake means has an end adapted for driving stake means into the ground at a depth corresponding to the desired pitch of the pipe.

A cradle means for supporting the pipe is provided. The cradle means is attached to the stake means.

An adjustable holding means is provided. The adjustable holding means is attached to said cradle means. The adjustable holding means holds the drainage and sewer pipe on said cradle means while the drainage and sewer pipe is being surrounded by back-fill material. The adjustable holding means is adapted to enable different sizes of pipe to be held on the cradle means.

DETAILED DESCRIPTION OF THE INVENTION

During the course of this description like numbers will be used to identify like elements according to the different views that illustrate the invention.

Figure 1:
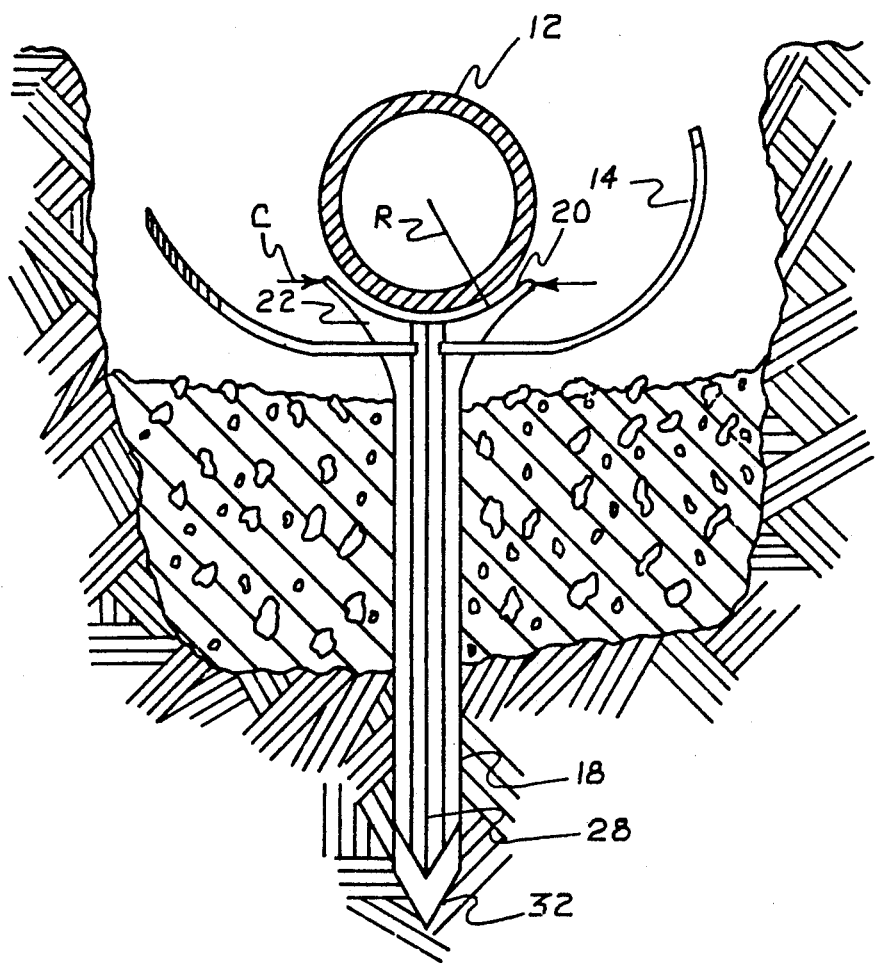
FIG. 1 illustrates a front view of the invention supporting a typical drainage and sewer pipe.

FIG. 1 illustrates the preferred embodiment of the apparatus according to the invention. Invention 10 is shown in a front view. Cradle 22 provides support for pipe 12. The radius R of supporting surface 20 of cradle 22 and chord C corresponds to the range of pipe diameters to be installed. For pipe size up to four inches, the preferred dimension for the chord C is approximately three and one half inches.

As shown, cradle 22 flares into and is integral with stake 18. In this preferred embodiment, cradle 22 and stake 18 are fabricated in a single piece of polypropylene plastic. However, other materials are suitable such as polyethylene, nylon, urethane, cast metal or wood.

Tie-strap 14 in the preferred embodiment shown in FIG. 1 comprises a nylon lockable band-tie such as manufactured by Panduit Corporation. However, wire, twine, monofilament line and other flexible, easily adjusted fasteners would be reasonable substitutes provided that pipe 12 can remain securely fastened to cradle 22 during the back-filling operation. In order to securely and quickly fasten 4 inch drainage and sewer pipe, tie-strap 14 should be provide at least 15 inches of threaded material.

The length of stake 18 is not critical but must be long enough to provide sufficient stability when driven into the ground and still hold the pipe off the ground high enough to permit back-fill to surround pipe 12 at the specific depth. The length of stake 18 will vary according to the type of installation and the local soil conditions and code requirements. To meet the specifications for a typical septic system installation in the New England region, stake 18 should be approximately 12 inches long. In the preferred embodiment using polypropylene plastic, the cross-sectional diameter should be approximately 1 inch thereby providing sufficient rigidity to hold the pipe firmly in place during the placement of the back-fill material. Driven end 32 of stake 18 should be substantially pointed to facilitate inserting stake 18 in the ground.

Figure 2:
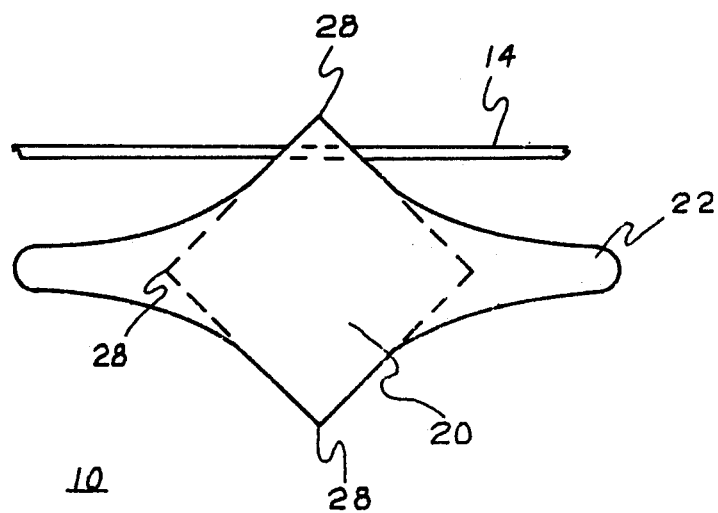
FIG. 2 illustrates a top view of the invention showing the attachment to the tie-strap.

FIG. 2 shows the preferred cross-sectional configuration of stake 18 looking down on cradle 22 at support surface 20. Strengthening ribs 28 are opposed to one another with slot 30 through one rib 28 serving to fasten tie-strap 14 securely to cradle 22. The cross-sectional shape of stake 18 is not critical and can be round, rectangular, triangular or any polygon shape having sufficient cross-sectional area to provide the required support. In the preferred embodiment, strengthening ribs 28 give a fluted shaped to stake 18 enabling it to be easily driven into the ground and providing a point of attachment for tie-strap 14 as shown.

Figure 3:
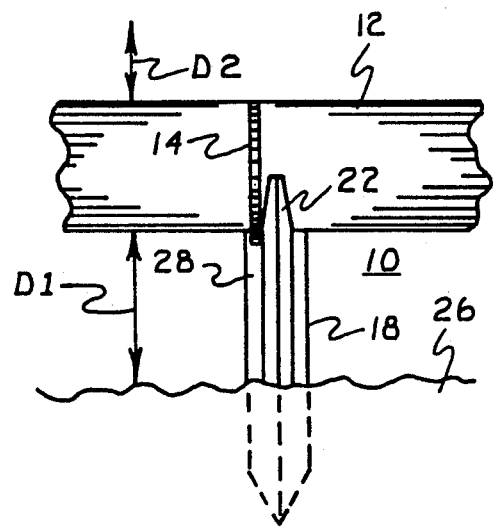
FIG. 3 illustrates a side view of the invention supporting a section of drainage pipe as it would appear prior to back-filling.

FIG. 3 shows a side view invention 10 holding pipe 12 securely in place prior to having back-fill material placed around pipe 12. Invention 10 is driven into ground 26. Pipe 12 is supported off the ground distance D1. For a typical New England leach field application, D1 is 6 inches. This enables sufficient back-fill material, depending on the system design, to be place beneath pipe 12. Tie-strap 14 keeps pipe 12 firmly in contact with cradle 22 throughout the single step the back-filling process as back-fill material is placed above pipe 12 to depth D2.

As example, a typical New England leach field requires depth D2 to be approximately 2 inches of crushed stone with the remaining material being that which was excavated from the leach field until the desired grade level is obtained. The field width is typically twenty feet with pipes spaced about five feet apart. The pipe should be supported by the invention at least every 10 feet.

Figure 4:
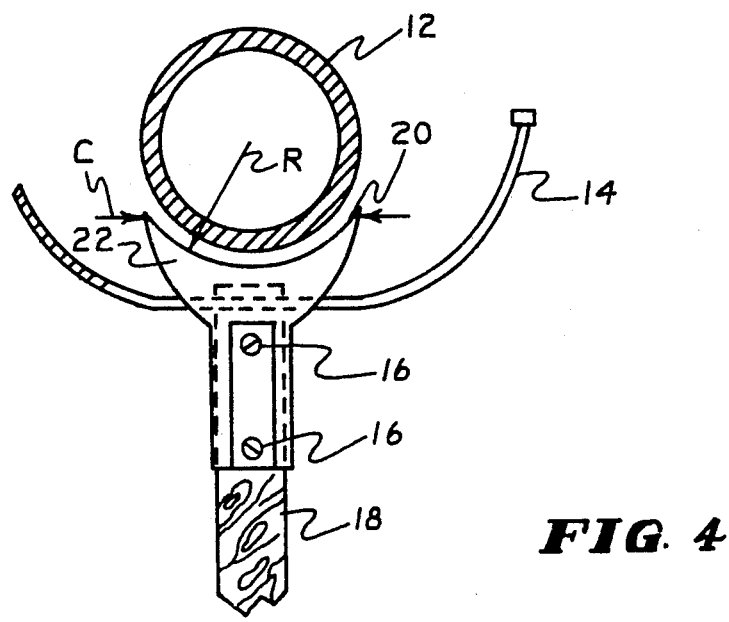
FIG. 4 illustrates a front view of an alternative embodiment of the invention.

FIG. 4 illustrates a front view of an alternative embodiment of invention 10. Cradle 22 is separate from stake 18. The preferred material for constructing cradle 22 is plastic, preferably fabricated in a single piece. The appropriate dimensions for radius R and chord C correspond to that specified for the preferred embodiment. Stake 18 would preferably be made of wood with a length of approximately 20 inches having a rectangular cross-section of at least 1 square inches. The end of stake 18 to be driven into the ground should be sharpened.

Cradle 22 is fastened to stake 18 by means of standard fasteners such as nails, screws, or bolts through fastening holes 16.

Figure 5:
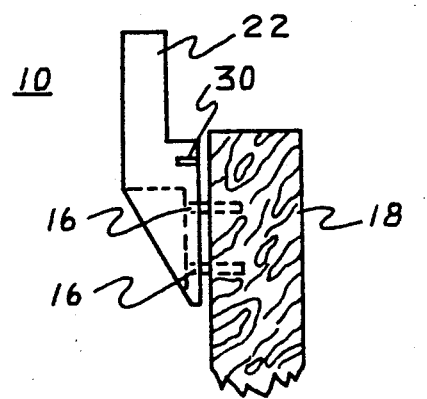
FIG. 5 illustrates a side view of the alternative embodiment of the invention.

FIG. 5 illustrates a side view of the alternative embodiment showing how tie-strap 14 is fastened to cradle 22 by means of slot 30.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for holding drainage and sewer pipe in position while back-fill material is applied in a single substantially continuous operation comprising:

stake means for positioning the apparatus at the required location with said stake means having an end adapted for driving stake means into the ground at a depth corresponding to the desired pitch of the pipe;

cradle means for supporting the pipe with said cradle means attached to said stake means, said cradle means having a arcuate supporting surface adapted to hold a plurality of pipe sizes, and said supporting surface having an arch with a radius of curvature at least equal to the radius of the largest pipe size to be supported, said supporting surface having a chord of said arc which is less than the diameter of the largest pipe size to be supported;

adjustable holding means, attached to said cradle means, for holding drainage and sewer pipe on said cradle means while the drainage and sewer pipe is being surrounded by back-fill material, said adjustable holding means adapted to enable different sizes of pipe to be held on said cradle means.

2. The apparatus of claim 1 wherein said stake means is integral with said cradle means.

3. The apparatus of claim 2 wherein said holding means further comprises a flexible, lockable, threaded strap.

4. The apparatus of claim 3 wherein said holding means is threaded through a slot located in said cradle means.

5. The apparatus of claim 4 wherein said cradle means and said stake means is fabricated from plastic.

6. The apparatus of claim 1 wherein said cradle means further comprises a plurality of openings through which common fasteners can be used to attached said cradle means to said stake means.

7. The apparatus of claim 6 wherein said stake means is fabricated from wood.

8. The apparatus of claim 7 wherein said holding means comprises a flexible, lockable, threaded strap.

9. The apparatus of claim 8 wherein said holding means is threaded through a slot in said cradle means.

10. A method of installing drainage and sewer pipe comprising:

driving a plurality of supports along the course of the pipe to be installed, spaced corresponding to the diameter and type of drainage pipe, with each support driven into the ground corresponding to the desired pitch of the pipe to be installed and depth of back-filled material needed beneath the pipe;

fastening the pipe to said supports so that the pipe is raised from the ground in the position corresponding to the required pitch in the pipe, and depth of back-fill material needed beneath the pipe, and the pipe course;

holding the pipe securely to said supports so that the pipe is kept firmly in contact with said supports during back-filling; and back-filling the pipe with said supports attached to the depth of back-fill material necessary to surround the pipe in a single, substantially continuous operation.

11. The method of claim 10 wherein each said supports further comprise:

stake means for positioning the apparatus at the required location with said stake means having an end adapted for driving stake means into the ground at a depth corresponding to the desired pitch of the pipe;

cradle means for supporting the pipe with said cradle means attached to said stake means;

adjustable holding means, attached to said cradle means, for holding drainage and sewer pipe on said means while the drainage and sewer pipe is being surrounded by back-fill material, said adjustable holding means adapted to enable different sizes of pipe to be held on said cradle means.

12. The method of claim 11 wherein said plurality of supports are fastened to the pipe at intervals no greater than ten feet.

* * * * *